Sept. 6, 1966                     H. F. OTT ETAL                     3,271,218
                    METHOD OF MAKING PRE-POPPED FILM TRANSPARENCY SLIDES
                                  Filed April 1, 1963
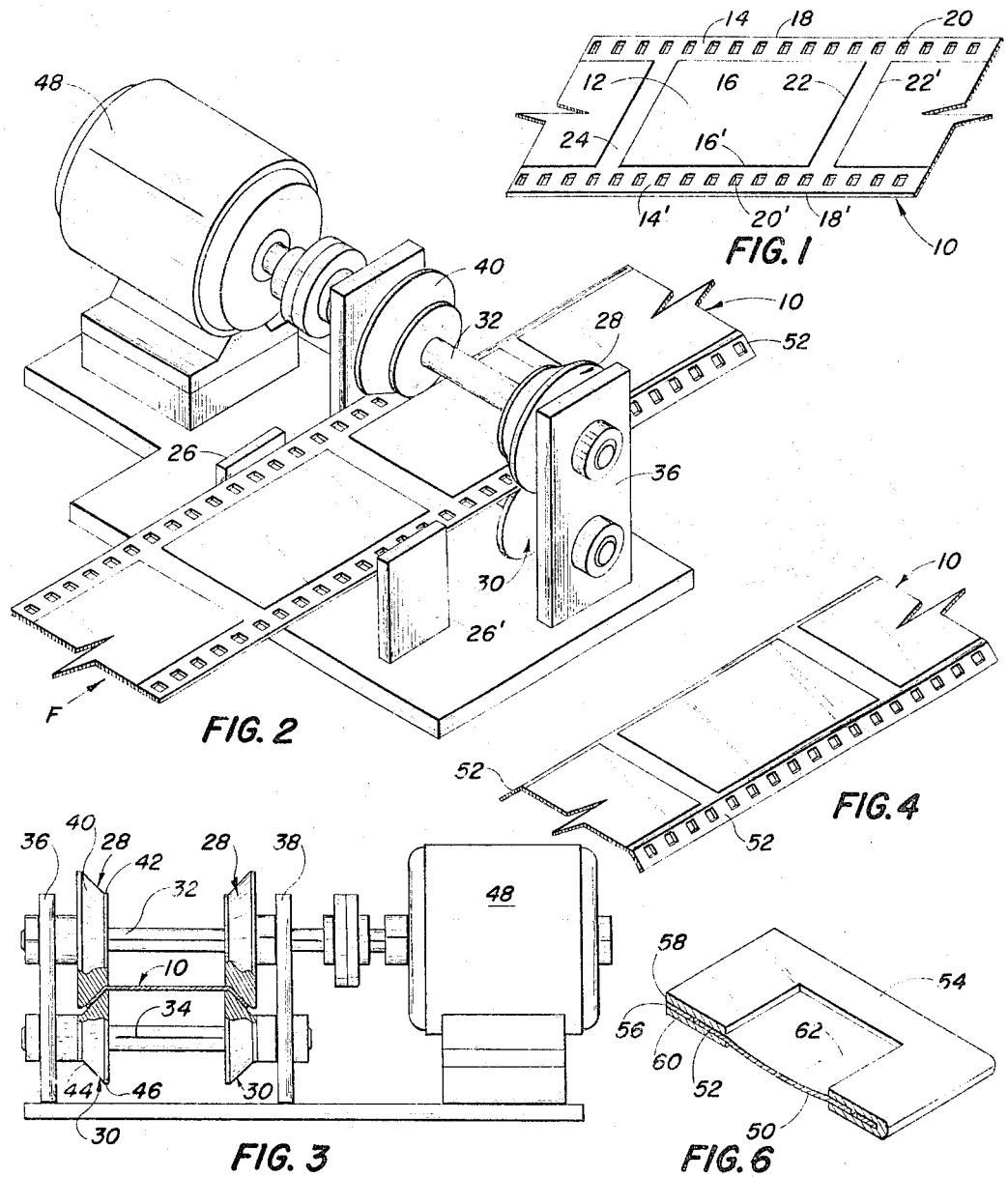
HOWARD F. OTT
JAMES J. HEFFER
INVENTORS
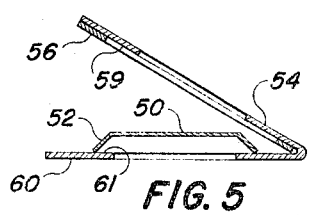
ATTORNEYS 3,271,218
METHOD OF MAKING PRE-POPPED FILM TRANSPARENCY SLIDES
Howard F. Ott and James J. Heffer, Rochester, N.Y., assignors to Eastman Kodak Company, Rochester, N.Y., a corporation of New Jersey
Filed Apr. 1, 1963, Ser. No. 269,619
5 Claims. (Cl. 156—108)

This invention relates to a mounted film transparency for use in a slide projector or viewer, and more particularly to a method for preventing the abrupt shifting or flexing of the plane of a mounted film transparency during its exhibition. Abrupt shifting or flexing of the plane of the film transparency is commonly referred to as "popping" and occurs most frequently when the film transparency becomes heated during projection, resulting in an objectionable and annoying defocusing of the projected image.

As now understood, without any intention of limiting the scope of the invention by any theoretical aspects, it is believed that two separate but related physical characteristics of the film transparency determine the amount of the "popping" action thereof.

First, in the manufacture of film, a plurality of layers of gelatin emulsion may be coated on one side of a clear plastic support, such as cellulose acetate. The thickness of the gelatin layers and the physical curl or curvature of the support determines the resulting curvature of the processed film.

Secondly, the emulsion side of the film will absorb moisture to a much greater degree than the support side of the film, such being conducive to linear expansion of the emulsion side of the film to a greater degree than the support side of the film.

As a result, the finished film transparency is generally supplied to the consumer with an inherent curvature wherein the emulsion-coated side is somewhat convex. A film transparency with such curvature is said to possess negative curl. It has been found that such film transparencies tend to abruptly shift or pop from a negative curl to a positive curl (emulsion-coated side concave) while being exhibited in a slide projector, thereby producing the above-mentioned objectionable defocusing effect.

Shifting of the film transparency is due in part, at least, to the fact that when the transparency is subjected to heat, the moisture absorbed by the emulsion layer is evaporated, thus causing the emulsion layer to contract in its linear dimensions. However, because of the physical curl characteristics of the film support, the support will resist the contracting action of the emulsion layer until a sufficient quantity of moisture is evaporated from the emulsion layer, such that the stress generated in the emulsion layer will overcome the physical curl of the support and "pop" the film transparency into a positive curl configuration.

We have found that this objectionable shifting or popping can be eliminated by bending the marginal portions of the film transparency adjacent the image area out of the normal plane of the transparency such that when the marginal portion is sandwiched between the frames of the mount the transparency is pre-stressed so as to impart and maintain a positive curl in the image area. Thus, the transparency is, in effect, "pre-popped" before it is subjected to the heat and consequent reduced relative humidity in a projector.

It is, therefore, a principal object of the present invention to provide a method of forming a pre-popped film transparency mounted in a conventional slide mount.

Another object of the present invention is to provide a method of shaping a film transparency which will be pre-popped when mounted in a conventional slide mount.

Other objects and a fuller understanding of the invention can be had by referring to the following description and claims taken in conjunction with the accompanying drawings in which:

FIG. 1 is a perspective view of a portion of an unmounted, processed film transparency strip;

FIG. 2 is a perspective view illustrating the method and apparatus used to bend the marginal portions of the film transparency shown in FIG. 1;

FIG. 3 is an end view, partly in section, of the apparatus and film transparency shown in FIG. 2;

FIG. 4 is a perspective view of an unmounted filmstrip shaped by the method and apparatus of FIGS. 2 and 3;

FIG. 5 is a sectional view of a partly open conventional foldable mount illustrating the mounting of a single preformed film transparency shaped according to the method and apparatus of FIG. 2; and FIG. 6 is a perspective view, partly in section, illustrating a finished mounted film transparency made in accordance with the present invention.

In order to facilitate the understanding of the invention, a brief summary will be helpful. Generally, in mounting a film transparency the marginal portions bounding the image area of a film transparency are sandwiched between two halves or frames of a paperboard slide mount. Each frame of the slide mount has an aperture centrally located therein arranged so that, when assembled, the apertures are substantially in alignment with each other to frame the image area of the film transparency. In our method of forming a film transparency, at least two opposite marginal portions adjacent the image area are bent, prior to insertion in the mount, so as to lie in planes other than the normal plane of the transparency. Thus, when the transparency is mounted in a conventional mount, closing of the mount halves will force the marginal portions into a common plane, thereby imparting a curvature to the interventing image area. Curvature of the image area in a positive curl direction can be controlled by bending each of the marginal portions in the same direction away from the emulsion coated surface.

Referring more particularly to FIG. 1, there is illustrated a typical processed filmstrip 10 which includes a plurality of substantially evenly spaced rectangular image areas 12 of uniform size. Filmstrip 10 also includes marginal portions 14 and 14' extending from the outer edges 16 and 16' of each image area 12 to the respective edges 18 and 18' of the filmstrip. A plurality of perforations 20 are located in each of the marginal portions 14 and 14'. The transverse edges 22 and 22' of adjacent image areas 12 are separated by a frame area 24 which is of sufficient width that when filmstrip 10 is separated into individual transparencies, a small border area is retained with each individual film transparency.

Our improved method and apparatus for pre-popping a film transparency is best illustrated in FIGS. 2-6. A pair of guide members 26 and 26' direct a moving filmstrip 10 into a given path so as to feed the filmstrip intermediate two pairs of co-operating complementally arranged forming rollers 28 and 30 secured to shafts 32 and 34, respectively. Shafts 32 and 34 are positioned parallel to each other and are each journaled for rotation in bearing members 36 and 38, shaft 32 being driven as by an electric motor 48. Each of the rollers 28 has a configuration which includes a frusto-conical portion 40 and a cylindrical portion 42 located coaxially at the smaller diameter end of portion 40. Each of the rollers 30 has a configuration which includes a frusto-conical portion 44 and a cylindrical portion 46 located coaxially at the larger diameter end of portion 44. Rollers 28 and 30 are secured to shafts 32 and 34, respectively, with their cylindrical end portions 42 and 46 innermost and directly opposite one another. They are preferably so located on their shafts that the spacing between the outer ends of their cylindrical portions is substantially equal to the width of the image area of the filmstrip.

Shafts 32 and 34 which carry rollers 28 and 30, respectively, are separated from each other on bearing members 36 and 38 such that the frusto-conical portions 40 and 44 as well as the cylindrical portions 42 and 46 of rollers 28 and 30, respectively, are spaced from each other a distance substantially equal to the thickness of a filmstrip 10 adapted to move therebetween.

In operation, a processed filmstrip 10 having its emulsion coated side facing upwardly as shown in FIGS. 2 and 3 is guided and fed in the direction indicated by arrow F, between the two pairs of co-operating rollers 28 and 30. The marginal portions 14 and 14' of filmstrip 10 are nipped between the two sets of rollers and propelled through the apparatus. The conical portions 40 and 44 of rollers 28 and 30, respectively, engage the opposite marginal portions 14 and 14' of filmstrip 10 and bend each of the marginal portions sharply downwardly out of the plane of the image area 12 as the filmstrip passes therebetween. Preferably, as previously indicated, the lateral spacing of the rollers is such that the bends in filmstrip 10 coincide with the edges 16 and 16' of each image area, but it is not necessary to precisely bend along these edges, as the filmstrip can be bent in the marginal portions along lines spaced slightly outside the image area and still be effective for pre-popping the transparency. In either event the bend must be sufficiently abrupt that the marginal portions will be permanently deformed out of the plane of the central image area of the strip.

After this bending operation is completed, the preformed filmstrip 10 can be directed into any known cutting device (not shown) to separate the filmstrip into a plurality of individual film transparencies.

Referring to FIGS. 5 and 6, an individual film transparency 50 with its downwardly turned marginal portions 52 is then mounted in a conventional mounting frame 54 which includes a pair of apertured mount halves, a spacer 56 of a thickness approximately equal to that of the film transparency having an aperture therein of a suitable size to accept the film transparency. The mount halves are sealed together as seen in FIG. 6; and this confines the downwardly turned marginal portions 52 between the flat surfaces 59 and 61 surrounding the apertures in the halves 58 and 60 of the mounting frame, thereby applying pressure to the marginal portions and causing the image area 62 of the transparency to be curved relative to the plane of the mounting frame 54 so that the transparency 50 assumes the downwardly directed convex shape with the emulsion coated side on the upper surface. The transparency is thus mounted with a permanent curvature which effectively prevents the popping of the transparency during its exhibition.

It will be seen that the invention embodied in the above-described method and apparatus provides for an improved mounting of film transparencies in which the mounted film transparency has a permanent curvature formed in the transparency so that popping does not occur during the exhibition of the slide. Since the curvature is formed by the engagebent of the marginal portions of the transparency with the inner surfaces of the mount, the method and apparatus disclosed hereinabove involves no danger of injury to the picture-bearing portion of the transparency. It will be readily appreciated that, if desired, the forming wheels can be heated so that they will more readily impress the bend in the marginal portions of the filmstrip.

The invention has been described in detail with particular reference to a preferred embodiment thereof, but it will be understood that variations and modifications can be effected within the spirit and scope of the invention as described hereinbelow and as defined in the appended claims.

We claim:
1. The method of making pre-popped film transparencies from an elongated filmstrip of the type wherein the filmstrip includes a marginal portion along each longitudinal edge and a plurality of centrally located image areas, which comprises the steps of:
  (a) progressively bending said marginal portions of said filmstrip in a common direction out of the normal plane of said image areas by feeding said marginal portions of said filmstrip between pairs of cooperating rotatable forming rollers disposed on opposite sides of said transparency;
  (b) severing said filmstrip along lines transverse to said filmstrip and intermediate successive areas to obtain separate film transparencies;
  (c) mounting each of said film transparencies between a pair of apertured halves of a film mount with the marginal portions of the transparency positioned between the inner surfaces of the halves and the image area in registry with the aperture of each of the halves of the mount; and
  (d) securing said mount halves together with said surfaces engaging and applying pressure to said marginal portions whereby the image area of the transparency is stressed and a curvature is imparted thereto.

2. The method of making a pre-popped mounted film transparency as set forth in claim 1 which includes the step of moving said elongated filmstrip in a predetermined path past said forming rollers with said marginal portions in engagement therewith.

3. The method of making a pre-popped mounted film transparency as set forth in claim 1 in which said filmstrip has a light-sensitive emulsion coated on one surface, and said step of bending said marginal portions of said filmstrip directs said marginal portions away from said emulsion-coated surface.

4. The method of making a pre-popped mounted film transparency as set forth in claim 1 in which the step of bending said film transparency is performed along lines substantially coincident with the lateral edges of said image area.

5. The method of making a pre-popped mounted film transparency as set forth in claim 1 in which the step of severing said filmstrip to obtain separate film transparencies is performed subsequent to the step of bending said marginal portions of said filmstrip.

References Cited by the Examiner
UNITED STATES PATENTS
3,013,354   12/1961   Wiklund _____ 40—152

ALEXANDER WYMAN, *Primary Examiner.*

W. J. VAN BALEN, *Assistant Examiner.*